(12) United States Patent
Naskali et al.

(10) Patent No.: US 7,180,265 B2
(45) Date of Patent: Feb. 20, 2007

(54) CHARGING DEVICE WITH AN INDUCTION COIL

(75) Inventors: Matti Naskali, Tokyo (JP); Tetsuya Yamamoto, Chiba-ken (JP)

(73) Assignee: Nokia Corporation, Espoo (FI)

( * ) Notice: Subject to any disclaimer, the term of this patent is extended or adjusted under 35 U.S.C. 154(b) by 192 days.

(21) Appl. No.: 10/694,638

(22) Filed: Oct. 27, 2003

(65) Prior Publication Data

US 2004/0145343 A1    Jul. 29, 2004

Related U.S. Application Data

(63) Continuation-in-part of application No. 09/894,883, filed on Jun. 29, 2001.

(51) Int. Cl.
    *H01M 10/46* (2006.01)
(52) U.S. Cl. .................................................. 320/108

(58) Field of Classification Search ................ 320/107, 320/108, 111, 114, 115
See application file for complete search history.

(56) References Cited

U.S. PATENT DOCUMENTS

| 5,536,979 | A | * | 7/1996 | McEachern et al. ........ 320/108 |
| 5,592,066 | A | | 1/1997 | Fan ................................ 320/2 |
| 5,600,225 | A | | 2/1997 | Goto ............................. 320/2 |
| 5,680,028 | A | | 10/1997 | McEachern ................. 320/108 |
| 5,931,683 | A | | 8/1999 | Pinel ............................ 439/39 |
| 5,959,433 | A | | 9/1999 | Rohde ........................ 320/108 |
| 6,100,663 | A | | 8/2000 | Boys et al. ................. 320/108 |
| 6,184,651 | B1 | | 2/2001 | Fernandez et al. .......... 320/108 |

* cited by examiner

*Primary Examiner*—Edward H. Tso
(74) *Attorney, Agent, or Firm*—Harrington & Smith, PC

(57) ABSTRACT

A charging device including a battery; a first induction coil coupled to the battery; and an induction core extending through the first induction coil. The induction core has a portion which extends in an outward direction from the charging device and is adapted to removably couple with a second induction coil of a portable electronic device by extending into the second induction coil.

33 Claims, 10 Drawing Sheets

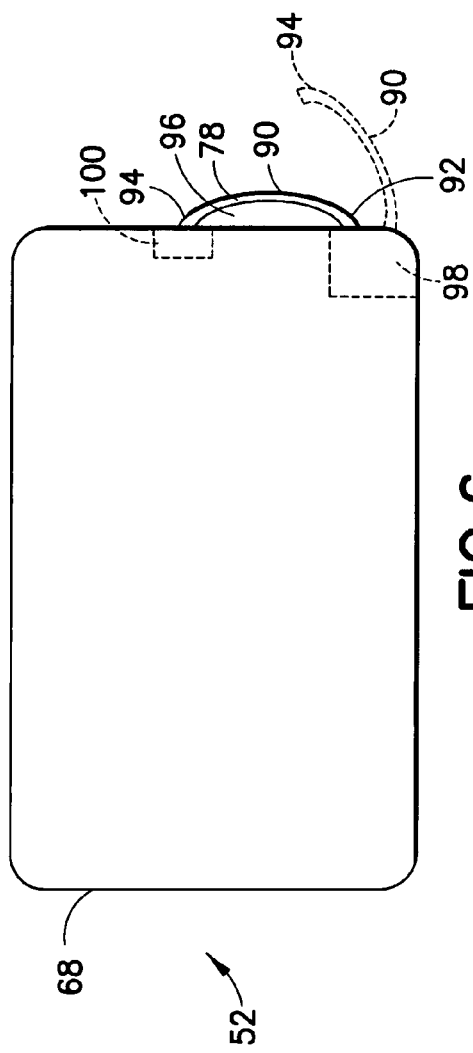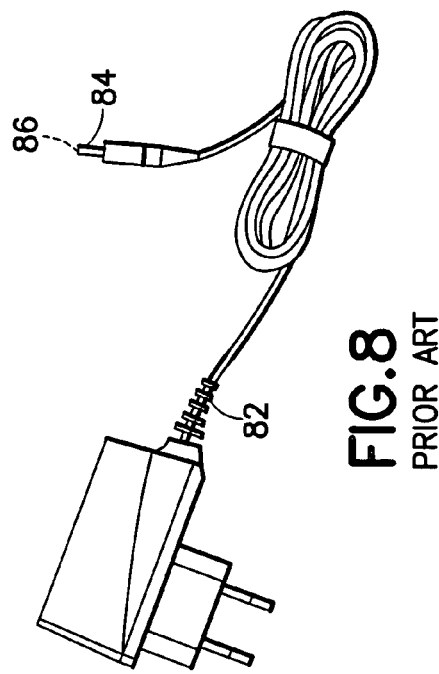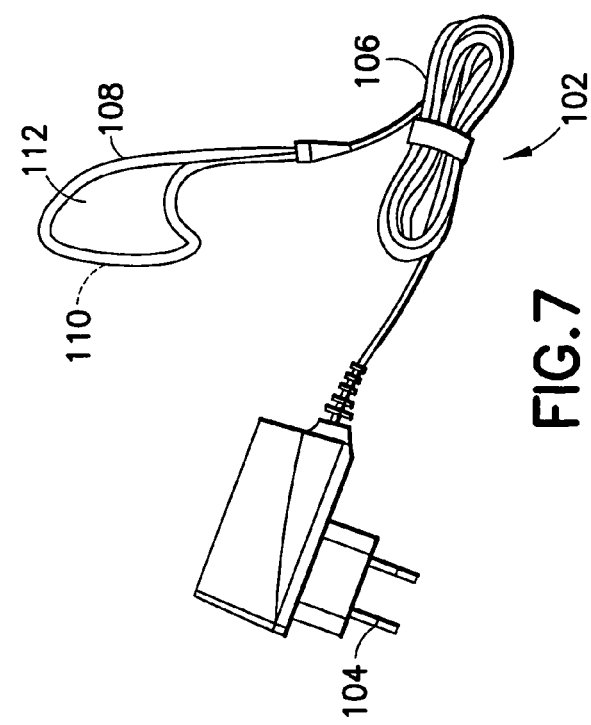

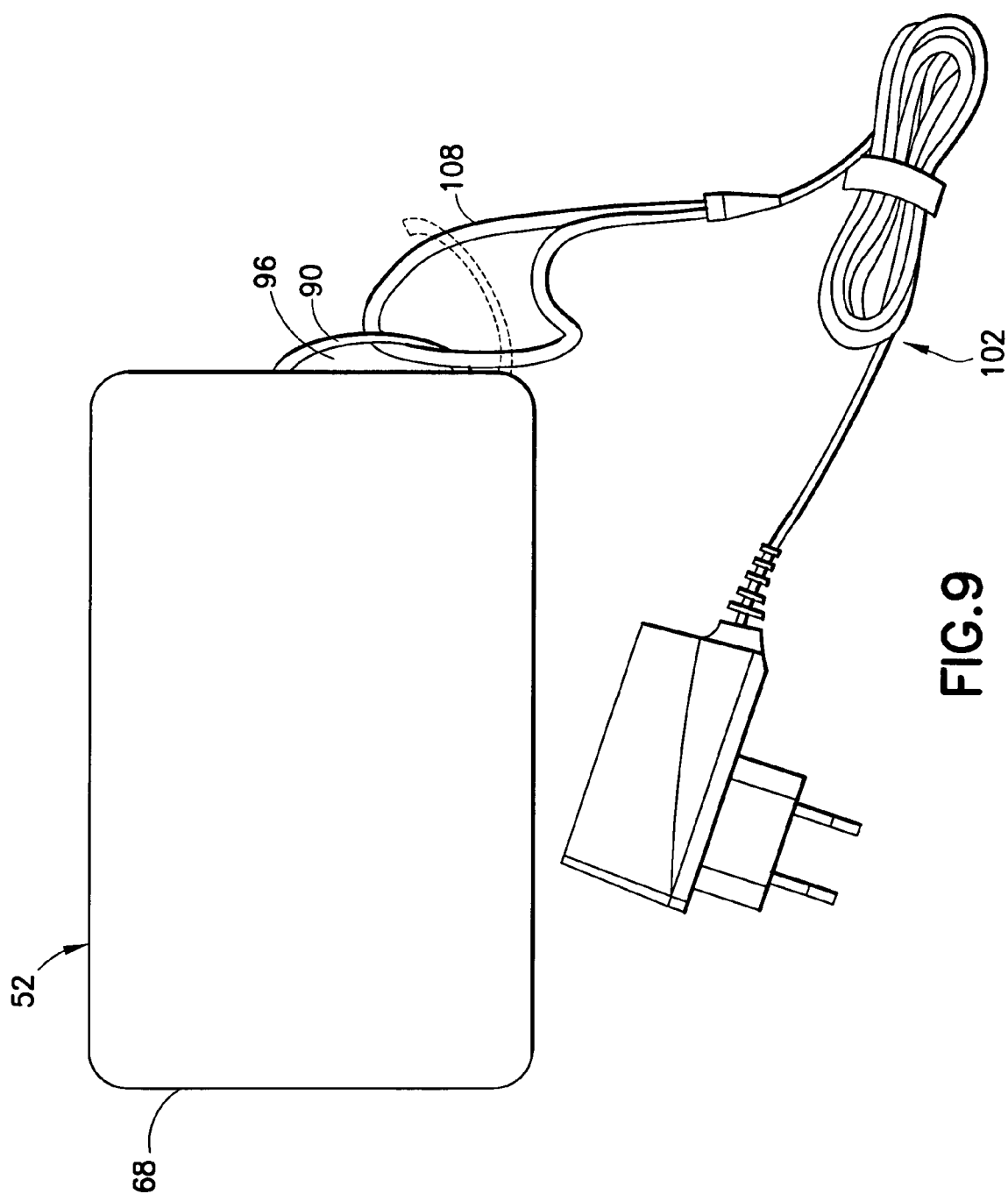

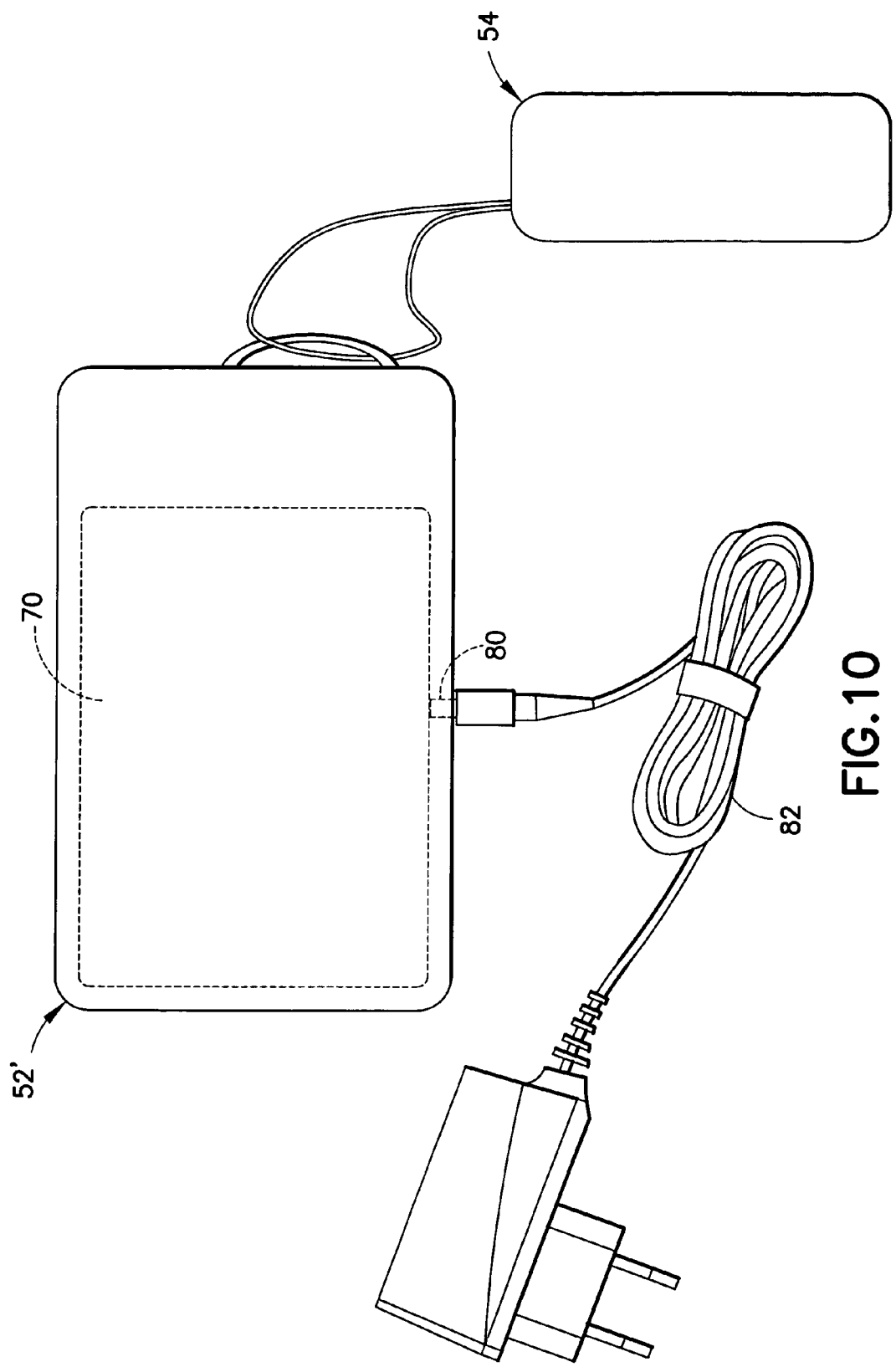

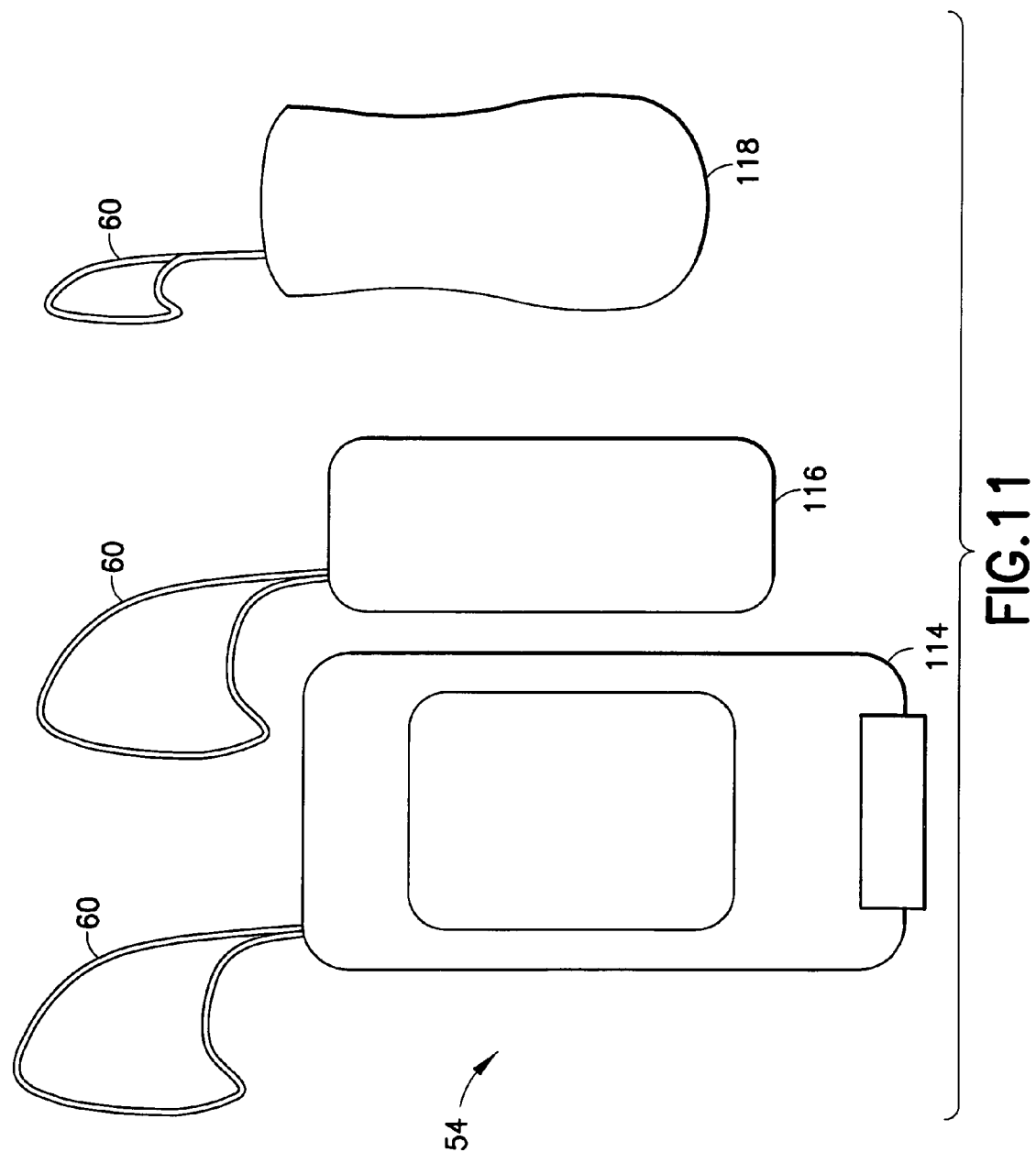

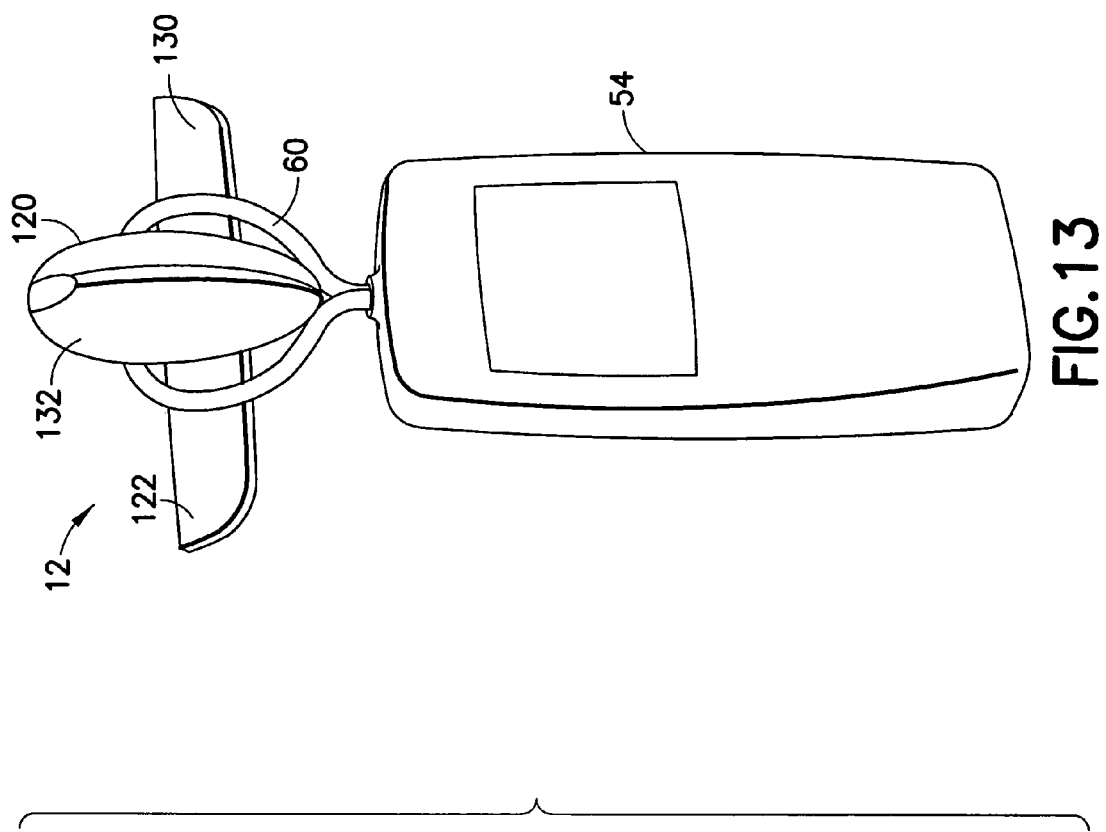
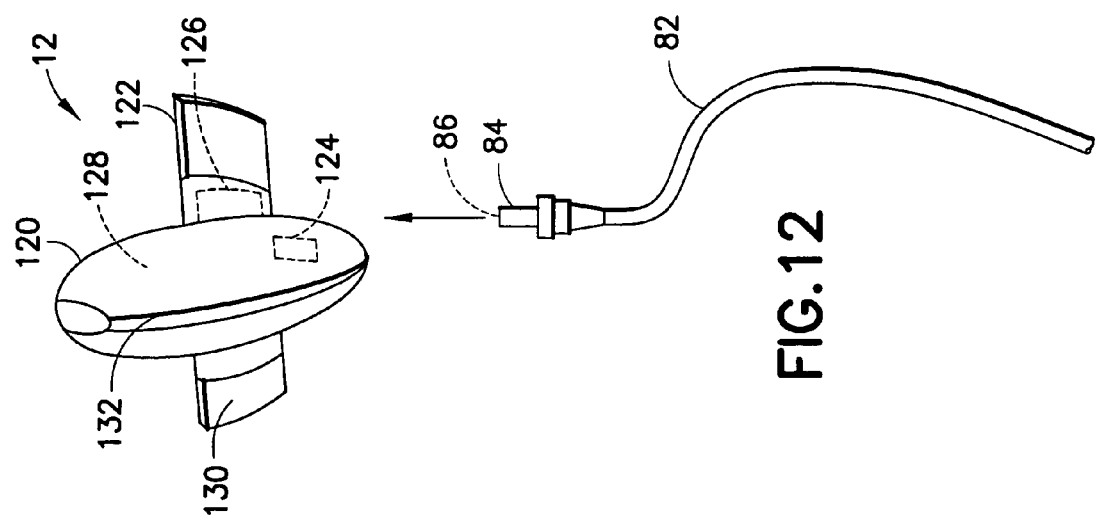

CHARGING DEVICE WITH AN INDUCTION COIL

CROSS-REFERENCE TO RELATED APPLICATION

This is a continuation-in-part patent application of U.S. patent application Ser. No. 09/894,883 filed on Jun. 29, 2001 which is hereby incorporated by reference in its entirety.

BACKGROUND OF THE INVENTION

1. Field of the Invention

The present invention relates to a charging system and, more particularly, to a charging system for a portable electronic device.

2. Brief Description of Prior Developments

The use of battery operated portable electronic devices has been increasing, such as mobile telephones, PDAs, MP3 players, etc. Problems associated with the discharge of batteries in portable electronic devices has, thus, been increasing. Likewise, the need to recharge batteries of portable electronic devices while away from the home or office has increased. Battery charging trays which use induction for charging batteries in portable electronic devices are known in the art, such as devices offered for sale by Splashpower Ltd. and MobileWise Inc. However, these types of battery charging trays must be directly connected to an electrical outlet or main, and have a relatively large footprint. A tray can be difficult to carry, and not all portable electronic devices have the necessary circuitry or chips to use these types of induction trays. Another problem is a simple organization issue, such as neatly organizing a family of different products, in a compact manner, with a charging device.

FIG. 1 in the accompanying drawings shows a portable telephone 1 being charged by a contactless charging system, based upon electromagnetic induction, which is known to exist in the prior art. The portable telephone 1 includes a secondary side coil 2. The charging system comprises a charger 3 which includes a primary side coil 7. A user can set the portable telephone 1 on the housing of the charger 3 as shown in the figure. The charger 3 can charge a battery 8 in the portable telephone 1, such as when the portable telephone has not been used for a long time or when the remaining battery capacity of the battery in the portable telephone become small.

With the prior art charging system shown in FIG. 1, a spacing 5 is provided between the primary side coil 7 and the secondary side coil 2. The charger 3 comprises a first induction core 6 located in the primary side coil 7. The telephone 1 comprises a second induction core 9 located in the secondary side coil 2. Because of the spacing 5, the induction cores 6, 9 are spaced from each other. Various problems exist with the prior art system shown in FIG. 1. Both the portable telephone 1 and the charger 3 need to include a separate core 6, 9 made of magnetic material, such as metal. The weight and the size of the portable telephone 1 and the charger 3 is increased because each of these components require a separate induction core. Since the primary side coil and the secondary side coil are separate from each other, even a small deviation in the relative position between the two coils can exert an influence on charging efficiency. In the event a magnetic item, such as a coin or an accessory article, is accidentally held or located in the receiving area 4 of the charger 3, heat can be generated in the magnetic item which can present a fire concern. The housing of the charger 3 has a receiving area 4 for receiving a portion of the portable telephone. The receiving area is sized and shaped for a specific size and shape of portable telephone. Therefore, the charger 3 is not adapted to allow a plurality of different sizes and shapes of portable telephones or other portable electronic devices, to be used with the charger.

There is a desire to allow induction charging of a battery in a portable electronic device without increasing the weight and size of the portable electronic device by having to include an induction core in the device. There is also a desire to increase charging efficiency in induction charging equipment by allowing larger deviations in relative positioning between coils in a charger and the portable electronic device. There is also a desire to reduce the risk of generating heat in items accidentally located near the charger. There is also a desire to provide a charger which is adapted to accommodate different geometries, shapes or sizes of portable electronic devices. There is a desire to provide a portable charging device which can be used without a real time connection with an electrical outlet or main. There is also a desire to provide an improved charging system which is readily adaptable to different charging configurations. There is also a desire to provide a portable electronic device having an induction charging loop which can be used for at least one other function, such as a structural support loop for supporting the electronic device in a hanging configuration, or such as being housed in conjunction with a signal indicator adapted to visually signal at least one characteristic of the portable electronic device.

SUMMARY OF THE INVENTION

In accordance with one aspect of the present invention, a charging device is provided including a battery; a first induction coil coupled to the battery; and an induction core extending through the first induction coil. The induction core has a portion which extends in an outward direction from the charging device and is adapted to removably couple with a second induction coil of a portable electronic device by extending into the second induction coil.

In accordance with one method of the present invention, a method of charging a portable electronic device is provided comprising steps of charging a first rechargeable battery in a first charging device, the charging device comprising a first induction coil coupled to the battery and an induction core extending through the first induction coil; and coupling a second induction coil of the portable electronic device to the induction core such that the induction core is located in the second induction coil. The first battery of the charging device can charge a second rechargeable battery in the portable electronic device by induction through the single induction core.

In accordance with another aspect of the present invention, a portable electronic device is provided comprising a housing having a housing support loop extending outward from the housing; a rechargeable battery located in the housing; an induction coil connected to the battery; and a signal indicator. The induction coil extends through the support loop with a hole of the support loop being located in a center path of the induction coil. The signal indicator extends along an elongated length of the support loop. The signal indicator is adapted to visually signal at least one characteristic of the portable electronic device.

In accordance with another aspect of the present invention, a battery charger is provided comprising a plug adapted to be connected to an electrical outlet; and an induction loop section having a hole adapted to receive an induction core of a device to be charged. The induction loop section has an induction coil coupled to the plug. A center path of the induction coil is located at the hole of the induction loop section. The induction loop section is adapted to be removably placed on the induction core and surround a portion of the induction core to allow the induction coil to induce current in the induction core.

In accordance with another aspect of the present invention, a battery charger is provided comprising an induction coil; an induction core extending through a center channel of the induction coil, the induction core comprising a portion extending out of the center channel a predetermined distance; a power feed section connected to the induction coil for supplying the induction coil with AC voltage; and a housing surrounding the induction coil and the induction core. The housing comprises a first section adapted to be stationarily attached to a mounting surface and a second section extending from the first section in a general cantilevered fashion. The portion of the induction core extends at least partially along the second section of the housing.

In accordance with another aspect of the present invention, a charging system for a portable electronic device is provided comprising a charging device and a first battery charger. The charging device comprises a rechargeable battery; a first induction coil coupled to the battery; and an induction core extending through the first induction coil. The induction core is adapted to removably couple with a second induction coil of a portable electronic device by extending into the second induction coil. The first battery charger comprises a plug adapted to be connected to an electrical outlet and an induction loop section having a hole adapted to receive the induction core in the hole.

BRIEF DESCRIPTION OF THE DRAWINGS

The foregoing aspects and other features of the present invention are explained in the following description, taken in connection with the accompanying drawings, wherein:

FIG. 6 is a front view of the charging device shown in FIG. 4;

FIG. 7 is a plan view of a second charging device for use with the charging device shown in FIG. 4;

FIG. 8 is a plan view of a conventional charging device which is adapted to be used as a second charging device with the charging system shown in FIG. 4;

FIG. 9 is a front view of the first and second charging devices shown in FIGS. 6 and 7 operably coupled to each other;

FIG. 10 is a front view of an alternate embodiment of the charging system shown in FIG. 4 with the conventional charging device shown in FIG. 8 attached as a secondary charging device to the primary charging device;

FIG. 11 is a front view of three different types of portable electronic devices which could be used separately or simultaneously with the primary charging devices;

FIG. 12 is a perspective view of an alternate embodiment of the primary charging device incorporating features of the present invention;

FIG. 13 is a perspective view of the primary charging device shown in FIG. 12 having a portable electronic device connected thereto;

DETAILED DESCRIPTION OF THE PREFERRED EMBODIMENTS

Figure 2:
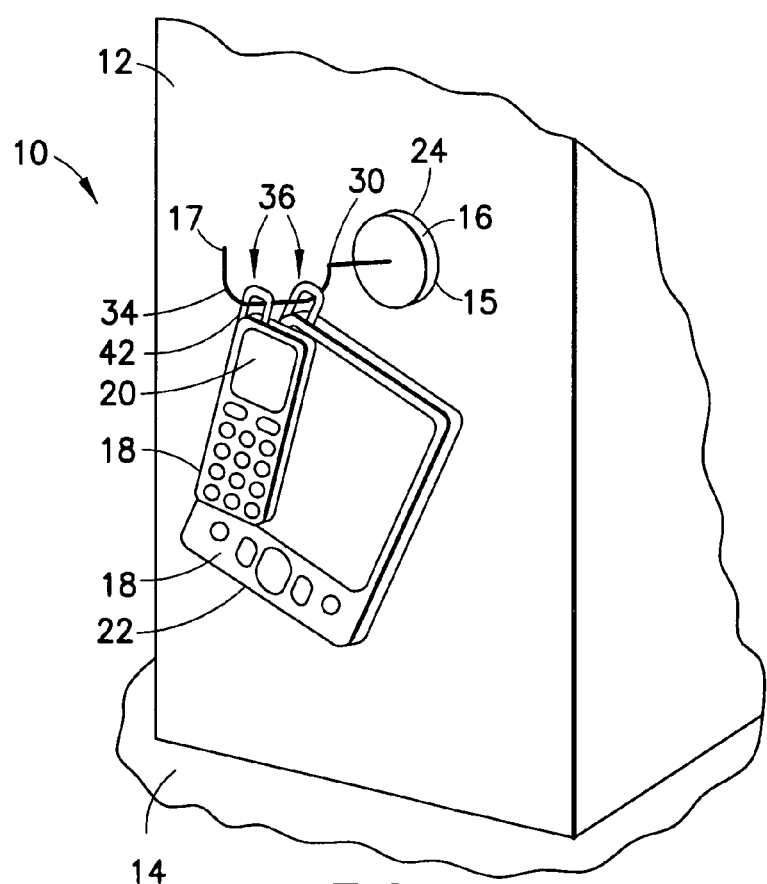
FIG. 2 is a perspective view of a charging system incorporating features of the present invention.

Referring to FIG. 2, there is shown a perspective view of a charging system 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The charging system 10 is shown connected to a wall 12 erected perpendicular to a floor 14 (the ground). In an alternate embodiment, the charging system 10 could be connected to any suitable component or surface. The charging system 10 generally comprises a charging device 16 and at least one portable electronic device 18. In the embodiment shown, the charging system 10 is shown with two of the portable electronic devices 18 connected to the charging device 16. In alternate embodiment, more or less than the two portable electronic devices could be connected to the charging device. The charging device could be configured to receive only one portable electronic device at a time, or more than two portable electronic devices at the same time. In the embodiment shown, the first portable electronic device comprises a mobile telephone 20 and the second portable electronic device comprises a PDA 22. However, in alternate embodiments, the portable electronic devices could comprise any suitable type of portable electronic device including, for example, a laptop computer, a hand-held game device, or a digital camera.

Figure 3:
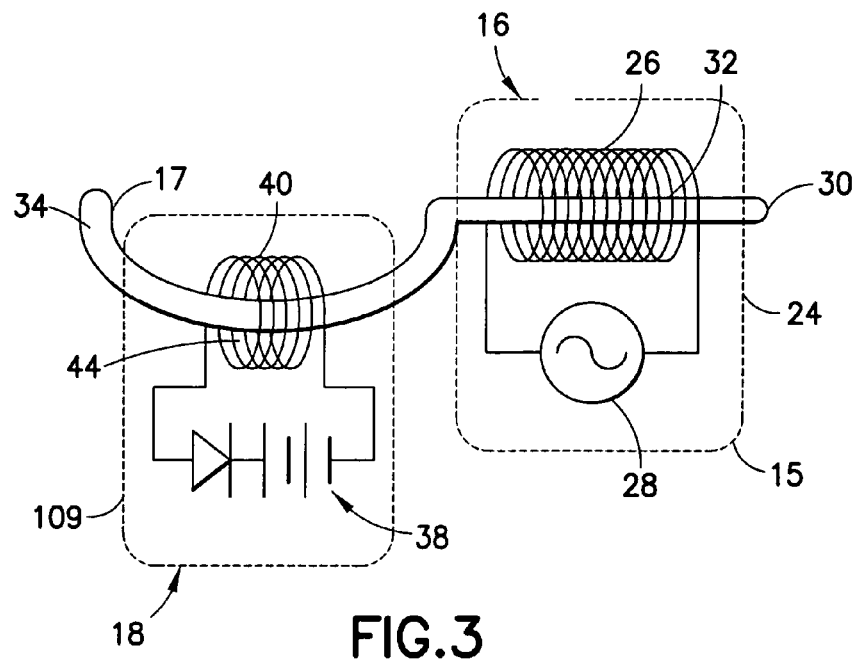
FIG. 3 is a diagrammatic view of two components of the system shown in FIG. 2.

Referring also to FIG. 3, the charging device 16 generally comprises a main section 15 and a charging hook section 17. The main section 15 generally comprises a housing 24, a primary side coil 26, and a power feed portion 28. In the embodiment shown, the housing 24 is shown attached to the wall 12. The housing 24 could be attached to the wall 12 by any suitable fastening system, such as screws or bolts for example. In an alternate embodiment, the housing 24 could be adapted to be placed on a horizontal surface, such as a desktop. In another alternate embodiment, the housing 24 could be attached, such as by adhesive, to a portion of an automobile, such as a dashboard. The power feed portion 28 could comprise an electrical connection with electrical wires running through the wall 12. In an alternate embodiment, the power feed portion 28 could comprise an electrical plug adapted to be removably connected to an electrical outlet. In another alternate embodiment, the power feed portion 28 could comprise an automobile accessory electrical connector, such as an electrical connector adapted to be inserted into a cigarette lighter connector. In the embodiment shown, the power feed portion 28 is adapted to provide an AC voltage.

The charging device 16 also comprises an induction core 30. In the embodiment shown, the induction core 30 has a general elongated shape. The induction core 30 comprises a first section 32 and a second section 34. The induction core 30 is comprised of ferromagnetic material, such as metal. The first section 32 of the induction core 30 is located in the center path of the primary side coil 26. The second section 34 extends out of the housing 24 in a general cantilevered fashion. The second section 34 could be covered with a suitable insulator.

The charging hook section 17 generally comprises the second section 34. The charging hook section 17 is adapted to support the portable electronic devices 18 thereon. In an alternate embodiment, the charging hook section 17 could comprise any suitable size or shape. As shown in FIG. 2, each of the portable electronic devices 18 comprise a support loop 36. The portable electronic devices 18 are adapted to be mounted on the second section 34 by locating the support loops 36 on the second section 34. Thus, the portable electronic devices 18 can be suspended from the second section 34 of the induction core 30. Because the housing 24 of the charging device 16 is fixedly attached to the wall 12, the portable electronic devices 18 can be suspended from the wall 12. The portable electronic devices 18 can be removed from the charging device 16 by merely sliding the support loops 36 off of the second section 34 of the induction core 30.

Each of the portable electronic devices 18 comprise a battery 38 and a secondary side coil 40. The battery 38 comprises a rechargeable battery. The rechargeable battery 38 could be removably connected to the rest of the portable electronic device. Alternatively, the rechargeable battery 38 might not be removable. The secondary side coil 40 is located in the support loop 36. More specifically, each support loop 36 comprises a hole 42. The secondary side coil 40 comprises a center channel 44 which is located at the hole 42. Thus, when the second section 34 of the induction core 30 extends through the hole 42, the second section 34 also extends through the center channel 44 through the secondary side coil 40. Thus, the induction core 30 penetrates through the secondary side coil 40 as shown in FIG. 3. The support loop 36 of the portable electronic device forms a charging arch. The secondary side coil 40 exist in an annular space which is defined by the charging arch shown in FIG. 2 and is contained within the arch.

As seen with reference to FIGS. 2 and 3, the portable electronic devices 18 do not need to be inserted into the housing 24 of the charging device 16. In fact, the portable electronic devices 18 can be spaced apart from the housing 24. This is because the induction core 30 extends out of the housing 24. The primary side coil, 26 is connected with the power feed portion 28, and the induction core 30 is mounted inside the primary side coil 26. When the power feed portion 28 provides an AC voltage, a magnetic flux is generated in the induction core 30. A voltage is induced across the secondary side coil 40 by the action of electromagnetic induction. Because the secondary side coil 40 is connected to the rechargeable battery 38, the rechargeable battery 38 can be recharged. The portable electronic device 18 can be supported on the charging hook section 17 for a predetermined time period, or any suitable time, for recharging of the rechargeable battery in the portable electronic device.

The embodiment described above has many various different advantages. The portable electronic devices 18 can be made smaller in size and lighter in weight than conventional induction recharged portable devices. This is because the portable electronic devices do not need a separate induction core for their secondary side coils 40. The charging system comprises a single induction core 30 which is used for both the charging device 16 and one or more of the portable electronic devices 18. The portable electronic device 18 is removably coupled with the single induction core 30. Thus, when the portable electronic device 18 is removed from the induction core 30, the portable electronic device is smaller and more light weight because the induction core 30 is not attached.

The single induction core 30 extends from the primary side coil 26 over to the secondary side coil 40. This provides a stable charging efficiency which can be attained by hanging the portable electronic device on the charging hook section 34. The portable electronic devices can be relatively easily slid onto and slid off of the cantilevered charging hook section 17. The location of the induction core 30 inside the center channel 44 of the secondary side loop 40 can be relatively precise. Thus, charging efficiency can be relatively stable. Precise positioning of the portable electronic device relative to the charger, such as in the conventional embodiment shown in FIG. 1, is not needed because the induction core 30 extends through the secondary side coil 40 of the portable electronic device.

Figure 1:
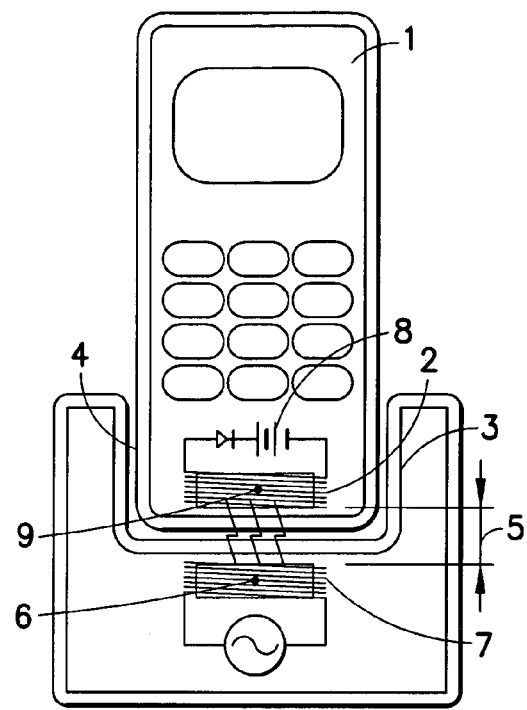
FIG. 1 is a schematic diagram of a conventional system of a battery charger stand used for charging a battery in a portable telephone by induction.

Because the charging device 16 does not comprise a cradle or receiving area, such as the cradle receiving area 4 in the conventional charger shown in FIG. 1, there is less likelihood that the charging device 16 can heat a small piece of metal, such as a coin. The charging device 16 does not comprise a receiving area which could hold such a small piece of metal, such as a coin. Thus, there is less risk of the charging device causing an accidental fire.

The charging device 16 is adapted to be coupled with a plurality of different types of portable electronic devices. As seen with reference to FIG. 2, regardless of the overall size and shape of the portable electronic devices 18, so long as the portable electronic device comprises a support/charging loop, such as loops 36, the portable electronic device can be used with the charging device 16. In addition, as shown in FIG. 2, the charging device 16 is adapted to provide a recharging function for more than one portable electronic device at a time. Multiple portable electronic devices can be recharged simultaneously.

As seen with reference to FIG. 2, the charging device 16 is adapted to be attached to a wall 12. The space required for the charging system can be reduced. The charging system 10 can have a smaller footprint than conventional induction charging systems, such as induction charging systems which comprise a tray.

With the present invention, conventional systems which employee electrical contacts in a charging connection portion need not be provided which requires the electrical contacts to contact the portable electronic device. Therefore, the portable electronic device can be waterproof. Additionally, or alternatively, problems of such as corrosion of the charging connection portion can be avoided.

The foregoing embodiment has been described with regard to charging with a charging arch provided on the side of the portable electronic device which is suspended by a hook shaped induction core extending from the main section of the charging device. In an alternate embodiment, charging may be performed in such a way that a charger body is installed (or buried) with an induction core extending upward, such as from a floor or desktop. In another alternate embodiment, the main section 15 of the charging device 16 could be mounted inside the wall 12, or inside a desk or automobile body.

In the embodiment described above, the system has been described as including the primary side coil, the power feed portion and the induction core as the constituent elements of the charging device. In an alternate embodiment, the charging device could comprise additional components. With the present invention, a charging system can be provided which is capable of accommodating various different types of portable electronic devices, including portable electronic devices having different sizes and shapes, and attaining a stable charging efficiency, regardless of the overall different sizes or shapes of the portable electronic devices, so long as the portable electronic devices are adapted to receive the second section 34 of the induction core of the charging device.

With the present invention, a charging system can be provided which comprises a charging device which includes an induction core penetrating through a primary side coil, and a portable equipment which includes an insertion portion containing a secondary side coil and allowing the induction core to pass therethrough. A charging device for a charging system can be provided which includes an induction core penetrating through a primary side coil, and a portable equipment which includes an insertion portion containing a secondary side coil and allowing the induction core to pass therethrough; the charging device comprising the primary side coil, and a power feed portion. A portable equipment can be provided comprising an insertion portion through which an induction core of the charging device penetrates through a primary side coil thereof and is allowed to pass, and in which a secondary side coil for performing charging is contained. A charging system can be provided which comprises a charging device which includes a hook shaped induction core penetrating through a primary side coil, and a portable a equipment which includes a charging arch containing a secondary side coil and allowed to be suspensibly attached to the induction core. A charging device can be provided for a charging system having the charging device which includes a hook shaped induction core penetrating through a primary side coil, and a portable equipment which includes a charging arch containing a secondary side coil and allowed to be suspendably attached to the induction core, comprising a power feed portion, the secondary side coil, and the hook shaped induction core. A portable equipment can be provided comprising a charging arch which is allowed to be suspendably attached to a hook shaped induction core of a charging device as it penetrates through a primary side coil thereof and which is provided at an end part of a body of the portable equipment, and a secondary side coil which serves to perform charging and which is contained in an annular space defined by the charging arch and a part under the arch.

Figure 4:
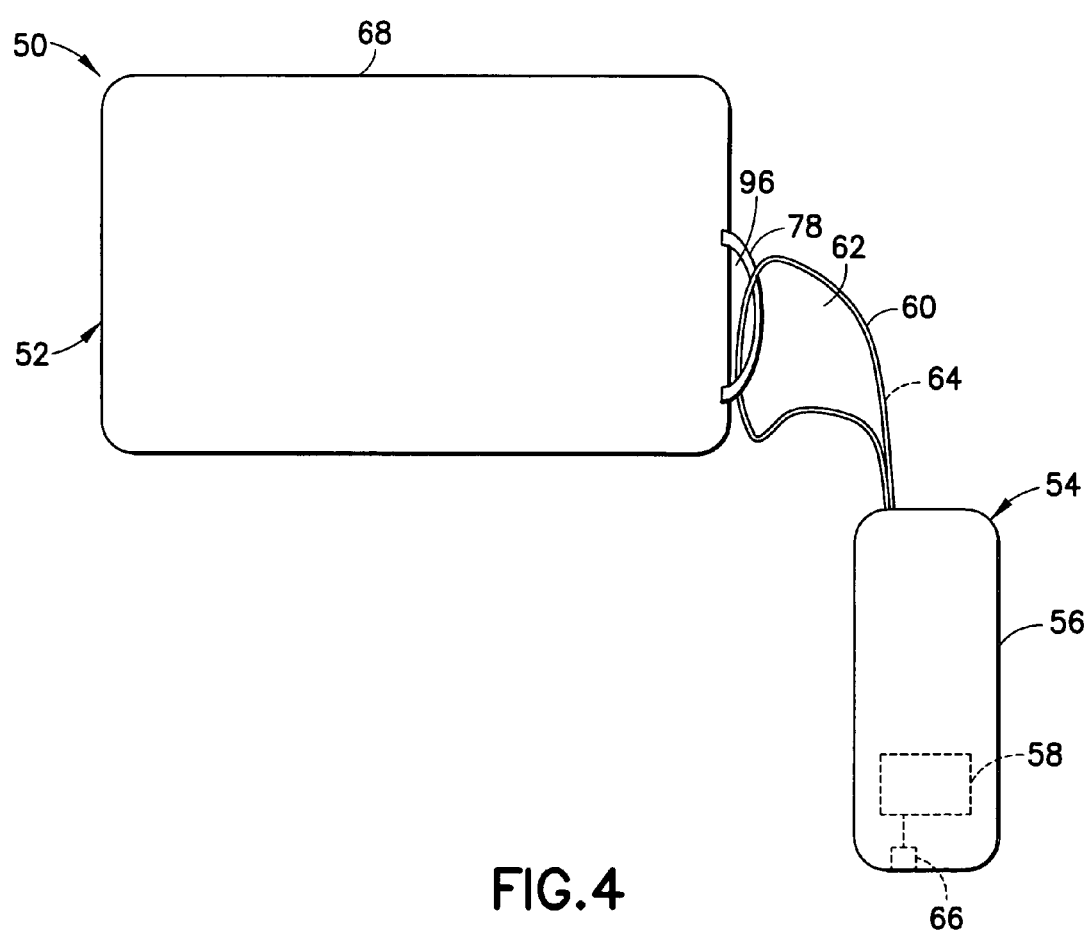
FIG. 4 is a front view of an alternate embodiment of a charging system incorporating features of the present invention.

Referring now to FIG. 4, an alternate embodiment of a charging system 50 incorporating features of the present invention is shown. The charging system 50 generally comprises a charging device 52 and a portable electronic device 54. The portable electronic device 54 can comprise any suitable type of device as mentioned above, such as a mobile telephone, a PDA, a hand-held computer game, etc. The portable electronic device 54 includes a housing 56, a rechargeable battery 58, and a support loop 60. In the embodiment shown, the support loop 60 comprises a wrist strap. The support loop 60 is flexible to allow a user's hand to pass through the center hole 62 of the wrist strap. In an alternate embodiment, the support loop 60 could be rigid, such as the support loops 36 shown in FIG. 2. In other alternate embodiment, the support loop 60 could have any suitable type of strap configuration, such as a neck strap for example. Referring also to FIG. 11, the charging device 52 can be used with a variety of different sizes and shapes of portable electronic devices 54, such as the devices 114, 116 and 118. The support loops 60 for these various different portable electronic devices could also comprise different sizes and shapes.

Similar to the embodiment shown in FIG. 2, the portable electronic device 54 comprises an induction coil 64 which extends through the support loop 60. The center path of the induction coil 64 is located at the hole 62 of the support loop 60; such as co-centered or co-axial. The wrist strap forms an induction loop section having the hole 62 adapted to receive an induction core of a battery charger. The induction coil 64 is coupled to the rechargeable battery 58 in the portable electronic device. Thus, the battery can be recharged by current induced at the induction coil 64. In addition to functioning as part of the battery recharging system for the portable electronic device 54, the support loop 60 is also adapted to support the housing 56, such as by suspension, on another item, such as a user's wrist or on the charging device 52 as further described below. The portable electronic device could also comprise a separate electrical connector 66 for directly mechanically and electrically connecting the portable electronic device to a battery charger having contacts. The connector 66 need not be provided.

Figure 5:
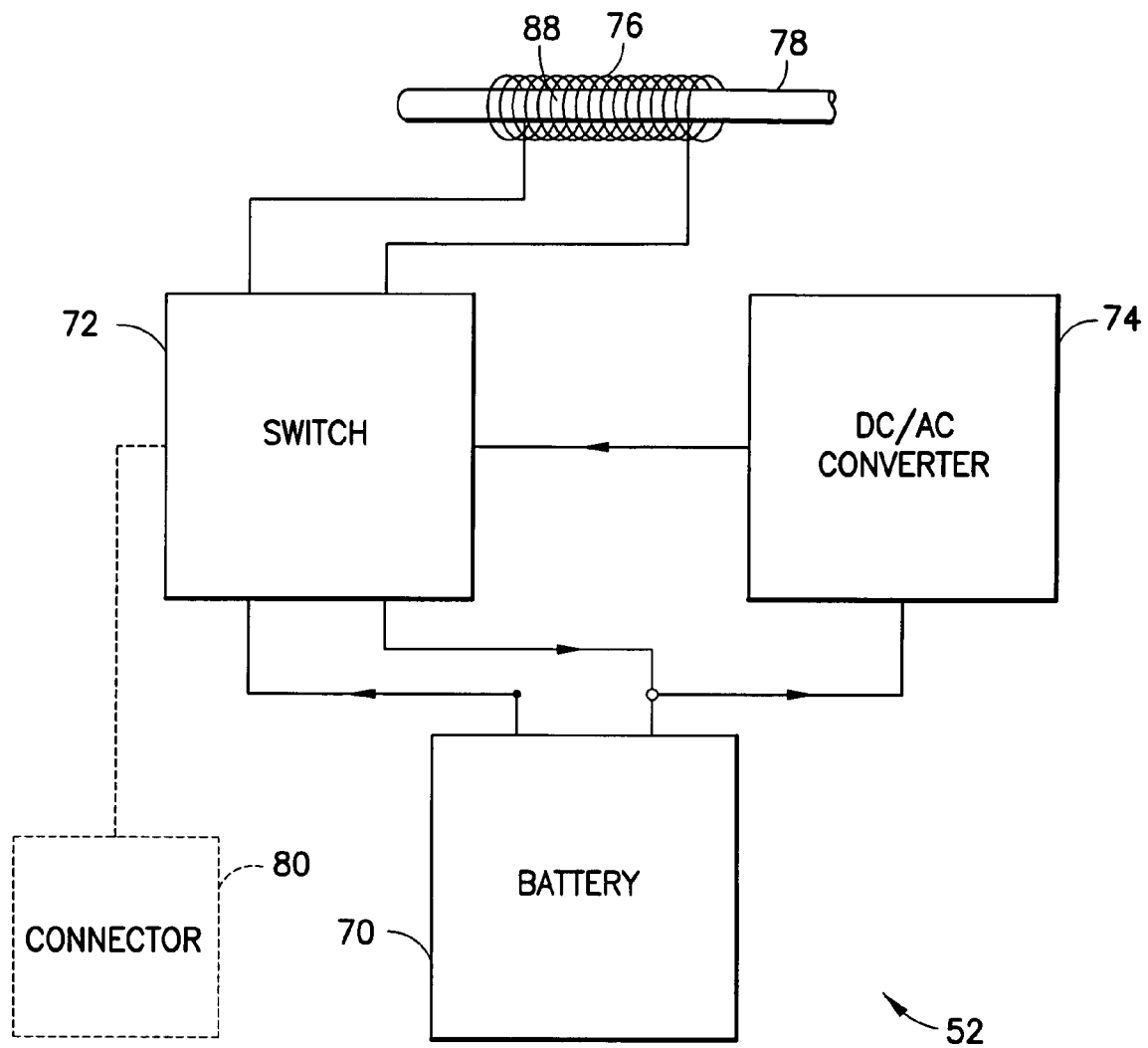
FIG. 5 is a schematic diagram of some of the components used in the charging device shown in FIG. 4.

Referring also to FIGS. 5–6, the charging device 52 generally comprises a housing 68, a rechargeable battery 70, a switch 72, a DC/AC converter 74, an induction coil 76, and an induction core 78. In an alternate embodiment, such as shown in FIG. 10 when the charging device 52' is adapted to have its battery 70 recharged by the conventional battery charger 82 shown in FIG. 8, the DC/AC converter 74 might not be provided. In such an alternate embodiment, the switch 72 also might not be provided. The charging device 52 could also comprise an electrical connector 80 for directly mechanically and electrically connecting the charging device 52 to a battery charger having contacts 84, 86, such as a conventional battery charger 82 shown in FIG. 8. However, the electrical connector 80 might not be provided. For example, the housing 68 could completely seal off the components located in the housing. This type of a sealed charging device might be particularly useful in applications such as camping, boating, and/or in the environments which are particularly dirty or wet.

The induction core 78 comprises a first section 88 (see FIG. 5) and a second section 90 (see FIG. 6). The first section 88 is located in the center channel of the induction coil 76. The second section 90 extends out of the housing 68 in a general cantilevered fashion. The second section 90 has a first end 92 which extends out of the housing 68 and a second end 94. As seen in FIG. 6, the second section 90 is movable relative to the housing 68 between a first open position, in which the second end 94 is located spaced from the housing 68, and a second closed position in which the second end 94 is located against the housing 68. The second section 90 of the induction core 78 could be pivotably attached to an end of the first section 88.

If the movable joint between the first and second sections is located inside or at a wall of the housing 68, the housing 68 will preferably comprises a sealing structure, such as a rubber boot, to provide a seal for the second section 90, but still allow the second section 90 to be movable between its first and second positions. If the movable joint is located outside of the housing 68, a sealing structure is preferably provided for the end of the first section 88 at the exit from the housing 68. In an alternative embodiment, the first and second sections 88, 90 might not be movable relative to each other. With this type of alternate embodiment, the induction coil 76 could be adapted to move inside the housing 68 with the first section 88 when the second section 90 is moved between its first and second positions.

The second section 90 of the induction core 78 forms a clamp or clasp for the charging device 52. As seen with reference to FIG. 4, the second section 90 is sized and shaped to provide an open area 96 between the inner facing side of the second section 90 and the outside surface of the housing 68. The second section 90 can be moved by a user to its open position shown in FIG. 6. The user can then insert a portion of the support loop 60 of the portable electronic device 54 between the housing 68 and the second section 90. The user can then move the second section 90 from its open position to its closed position shown in FIG. 4 to capture a portion of the support loop 60 in the area 96. In an alternate embodiment, any suitable type of movable connection between the first and second sections 88, 90 could be provided. The outwardly extending section 90 of the induction core 78 could comprise any suitable type of shape and could be movable relative to the housing 68 in any suitable type of movement. In alternate embodiments, alternate types of latching structures or supporting structures which also function as portions of an induction core could also be provided.

In a preferred embodiment, the charging device 52 comprises a detent system 98 which is adapted to retain the second section 90 at either its open position or its closed position until positively moved by a user. In an alternate embodiment, the charging device could comprise a latch 100 adapted to engage the end 94 of the second section 90.

As noted above, the first section 88 of the induction core 78 extends through the induction coil 76. The induction coil 76 is connected to the switch 72. The switch 72 is coupled to the terminals of the battery 70 and to the DC/AC converter 74. The circuit shown in FIG. 5 is adapted to control the flow of electricity either to the battery 70 from the coil 76, or from the battery 70 to the coil 76. When current flows from the battery 70 to the coil 76, the current flows through the DC/AC converter 74 to convert direct current into alternating current. In alternate embodiments, the charging device 52 could comprise additional or alternative components. For example, if the charging device 52 comprises the connector 80, the connector 80 is preferably coupled to the battery 70 by the switch 72. The switch 72 could also be adapted to provide current from the connector 80 directly to the coil 76.

The charging device 52 is adapted to charge the rechargeable battery 58 by power from the battery 70. The charging device 52 functions as a mother product which is adapted to charge batteries in satellite products, such as the portable electronic device 54, by use of an inductive loop. The satellite products can be totally insulated, having no galvanic parts, such as electrical contacts for recharging their rechargeable batteries. The battery 70 in the charging device 52 is much larger than the battery 58 in the portable electronic device. Thus, the charging device 52 can provide the portable electronic device 54 with a plurality of charges and/or can provide a plurality of portable electronic devices with charges before the battery 70 in the charging device 52 needs to be recharged or replaced.

In the embodiment shown in FIGS. 4–6, the charging device 52 does not comprise any externally located electrical contacts for recharging the battery 72. However, the battery 72 can be recharged while completely contained within the housing 68. Thus, the charging device 52 can provide a completely non-galvanic portable charger. Referring also to FIG. 7, a second charging device 102 is shown which can be used to recharge the battery 70 of the charging device 52. In this embodiment, the second charging device 102 generally comprises an electrical plug 104 connected by an electrical cord 106 to an induction loop section 108. The electrical plug 104 is adapted to be connected to an electrical outlet or main.

The induction loop section 108 is substantially the same as the support loop 60 of the portable electronic device 54. In particular, the support loop 60 comprises a closed loop strap. The induction loop section 108 is flexible to allow for compact storage of the second charging device 102. In an alternate embodiment, the induction loop section 108 could be rigid, such as the support loops 36 shown in FIG. 2. In other alternate embodiments, the induction loop section 108 could have any suitable type of strap configuration.

Similar to the embodiments shown in FIGS. 2 and 4, the induction loop section 108 comprises an induction coil 110 which extends through the induction loop section 108. The center path of the induction coil 110 is located at the hole 112 of the induction loop section 108; such as co-centered or co-axial. Referring also to FIG. 9, the induction loop section 108 is adapted to receive a portion of the second section 90 of the induction core 78 of a battery charger 52. More specifically, the induction loop section 108 can be placed on the second section 90 of the induction core 78 when the second section 90 is in its open position. The user can then move the second section 90 to its closed position. This captures a portion of the induction loop section 108 between the housing 68 and the second section 90. In an alternate embodiment, the charger 52 could comprise a second induction core for the induction loop section 108.

During recharging of the charging device 52, the charging device 52 can be charged by its inductive core 78. The clamp formed by the second section 90 is clamped to the charger loop 108 which becomes the primary coil of the charger system. The coil 76 of the charger unit 52 acts as the secondary coil during this recharging mode. However, the coil 76 of the charger unit acts as the primary coil during recharging of the portable electronic devices by the charging unit 52. Thus, the single coil 76 can function in two different modes based upon whether the charging device 52 is being charged or whether the charging device 52 is charging another component.

The induction coil 64 is connected to the rechargeable battery 58 in the portable electronic device. Thus, the battery can be recharged by current induced at the induction coil 64. In addition to functioning as part of the battery recharging system for the portable electronic device 54, the support loop 60 is also adapted to support the housing 56, such as by suspension, on another item, such as a user's wrist or on the charging device 52. The portable electronic device could also comprise a separate electrical connector 66 for directly mechanically and electrically connecting the portable electronic device to a battery charger having contacts. In a preferred embodiment, the induction loop section 108 of the second charging device 102 and the support loop 60 of at least one portable electronic device 54 can both be attached at the clasp 90 to the charging device 52 for charging both batteries 70, 58 at the same time.

Referring now to FIGS. 12 and 13, an alternate embodiment of the present invention is shown. In this embodiment a charging device 120 is shown attached to a wall 12. The charging device 120 generally comprises a housing 122, an electrical connector 124, an induction coil 126, and an induction core 128. The housing 122 generally comprises a first section 130 and a second section 132. The first section 130 is stationarily attached to the wall 12, such as by fasteners (not shown). The second section 132 extends outward from the first section 130. In the embodiment shown, the second section 132 comprises a general oval shape or general egg shape. The general egg shape is vertically orientated with a back side of the general egg shape being connected to the front side of the first section 130 of the housing. In a preferred embodiment, the second section 132 extends from the first section 130 in a general cantilevered fashion.

In this embodiment, the induction coil 126 is located in the first section 130. The induction core 128 extends through the induction coil 126 in the first section 130 and extends out of the induction coil a predetermined distance. The induction core 128 extends into the second section 132. The electrical connector 124 forms a power feed section which is connected to the induction coil 126 for supplying the induction coil with AC voltage. The electrical connector 124 is adapted to be connected to the contacts 84, 86 of the conventional charger 82. In an alternate embodiment, the charging device 120 could be attached to electrical wires inside the wall 12. As seen in FIG. 13, the portable electronic device 54 can be attached to the charging device 120 by placing the support loop 60 onto the second section 132 of the housing. The housing 122 functions similar to a coat hook on the wall 12. The contoured design of the housing 122 and, more particularly, the second section 132 provides a more attractive appearance for the charging device and extends away from the wall 12 a lesser distance than the hook shown in FIGS. 2 and 3.

Figure 14:
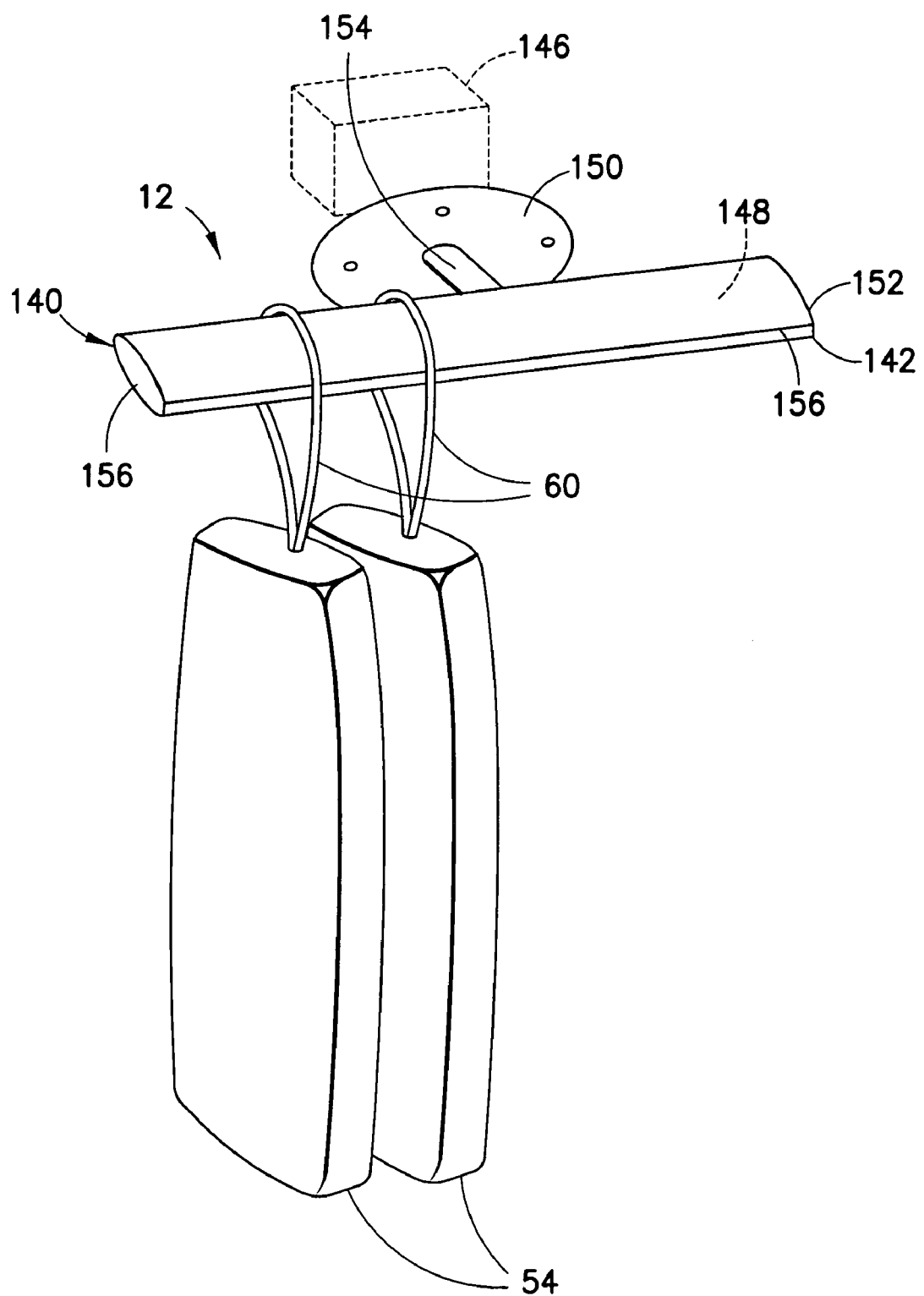
FIG. 14 is a perspective view of another alternate embodiment of the primary charging device incorporating features of the present invention, and showing two portable electronic devices connected to the primary charging device.

Referring now to FIG. 14, another alternate embodiment of the present invention is shown. In this embodiment a charging device 140 is shown attached to a wall 12. The charging device 140 generally comprises a housing 142, an induction coil 146, and an induction core 148. The housing 142 generally comprises a first section 150, a second section 152 and a third section 154 which connects the second section 152 to the first section 150. The first section 150 is stationarily attached to the wall 12, such as by fasteners (not shown). The induction coil 146 is connected to electrical wires inside the wall 12. In an alternate embodiment, the charging device 140 could comprise an electrical connector for connecting the charging device to a conventional charger, such as the charger 82 shown in FIG. 8.

The second section 152 extends outward from the first section 150. In this embodiment, the induction coil 146 is located in the wall 12. In an alternate embodiment, the induction coil 126 could be located in the first section 150, or the second section 152, or the third section 154 of the housing. The induction core 148 extends through the induction coil and extends out of the induction coil a predetermined distance. In the embodiment shown, the induction core 148 extends through the third section 154 and into the second section 152.

In this embodiment, the induction core 148 has a general T shape. A top of the T shape extends along the second section 152. The center shaft of the T shape extends along the third section 154 and into the induction coil 146. As shown in FIG. 14, the second section 152 of the housing is located spaced from the wall 12 and has a general elongated length. The second section 152 extends generally parallel to the wall 12. This configuration allows a plurality of portable electronic devices 54 to be hung on the second section 152 by their support loops 60. This can provide a multiple unit charging bay for a family of products. The second section 152 forms two cantilevered beam sections 156. The portable electronic devices 54 can be suspended off of both of the cantilevered beam sections 156. This type of embodiment allows a plurality of portable electronic devices to be hung on the charging device at the same time without the charging device extending to far away from the wall 12. This embodiment substantially reduces the risk of the charging device 140 being damaged, such as might be likely if the charging device extended a further distance away from the wall 12.

Figure 15:
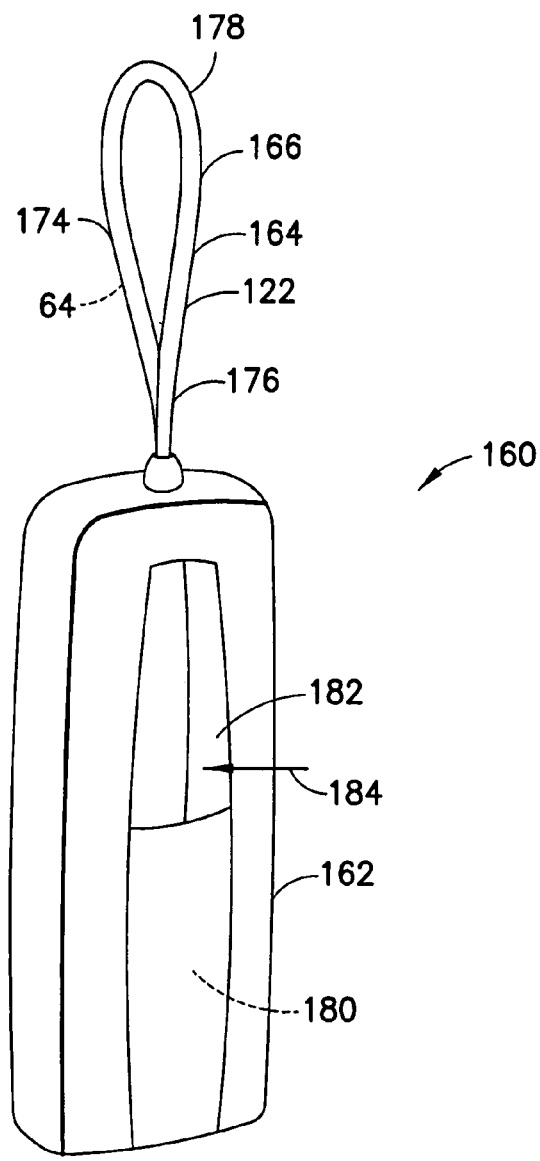
FIG. 15 is a perspective view of a portable electronic device having a signal indicator incorporating features of the present invention.
Figure 16:
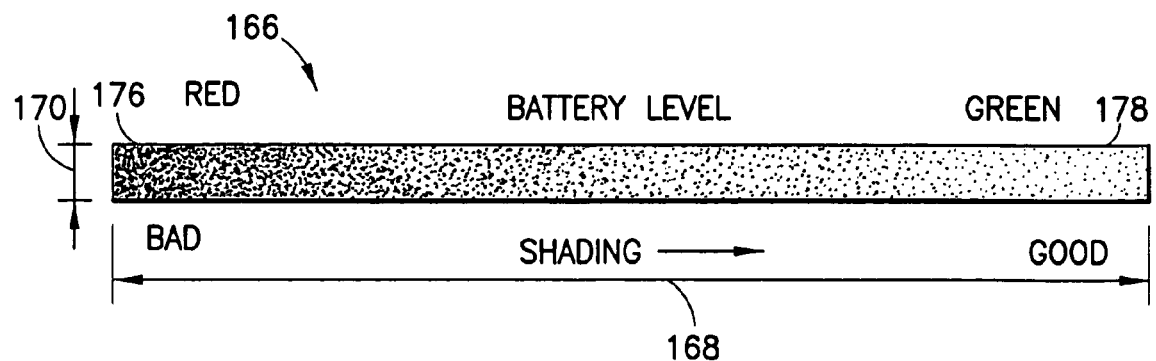
FIG. 16 is a diagrammatic view of the signal indicator used on the flexible support of the portable electronic device shown in FIG. 15.

Referring now to FIGS. 15 and 16, another feature of the present invention will be described. The portable electronic device 160 is a mobile telephone comprising a handset 162 and a wrist strap or support loop 164. The wrist strap 164 comprises an induction coil substantially identical to the support loop 60 shown in the prior figures. The wrist strap 164 comprises a signal indicator 166. In the embodiment shown, the signal indicator 166 is adapted to visually signal at least one characteristic of the portable electronic device 160. In an alternate embodiment, the signal indicator could additionally or alternatively be adapted to provide an audio signal, or any other type of a signal such as a magnetic or electrical signal.

In a preferred embodiment, the signal indicator 166 has a general elongated length 168 and a relatively small width 170. The signal indicator 166 extends along an elongated length of the support loop 164. The signal indicator 166 is located on one exterior side 172 of the support loop 164. In an alternate embodiment, a second signal indicator could be located on the opposite exterior side 174 of the support loop. In another alternate embodiment, the signal indicator could extend along both sides 172, 174.

A first end 176 of the signal indicator is located at the base of the support loop. An opposite second end 178 of the signal indicator is located at the outer end of the support loop. The signal indicator 166 is adapted to illuminate or change color from red at the first end 176 to green at the second end 178. More specifically, the signal indicator 166 is coupled to the battery 180 of the portable electronic device 160. The portable electronic device comprises a switch or button 182. When the button 182 is depressed as indicated by arrow 184, current is sent from the battery 180 to the signal indicator 166.

The signal indicator 166 is adapted to signal the strength of the battery charge; indicated by how far up the signal indicator the elimination occurs from the first end 176 to the second end 178. Similar types of battery charge indicators are provided on the sides of small size batteries and battery packaging; such as AA batteries. In an alternate embodiment, any suitable type of battery strength or level indicator could be provided. In an alternate embodiment, in addition to or as an alternative to the button 182, the portable electronic device could be adapted to activate the signal indicator 166 based upon another predetermined event. For example, the portable electronic device could be programmed to activate the signal indicator 166 while the battery 180 in the mobile telephone 160 is being charged.

In the embodiment in which the support loop 164 comprises an induction coil, the portable electronic device could be programmed or configured to automatically activate the signal indicator 166 when current is flowing through the induction coil 64. The signal indicator could change color during charging. Thus, the signal indicator could be adapted to indicate an operational state of charging of the battery in addition to, or as an alternative to, the charge level of the battery. The portable electronic device 160 could be configured to actuate the signal indicator automatically based upon a predetermined event, such as, for example, charging of the battery 180 by induction at the induction coil 64. Rather than indicating the at least one characteristic of the portable electronic device by color, the signal indicator could be adapted to indicate the characteristic by a shading change or level of illumination change of the signal indicator. The present invention can comprise locating a signal indicator on the flexible strap 164 which is adapted to signal at least one characteristic of the handset.

The present invention makes it possible to charge satellite products on the road. The invention makes it possible to design a product that is completely isolated, such as from water and dust, and is thus protected. The mother-unit-charger can be operated even under water. When compared to a tray charger, the charger system of the present invention can have one unit less if the power cable or adapter is connected to the mother unit instead of a tray. Also, the present invention does away with a tray which it can be difficult, or at least awkward or bulky, to carry. Even in the embodiment in which the mother unit is charged contactlessly with a loop charger, such as shown in FIG. 9, the loop charger is not needed very much on the road or when traveling; as the charge need of the satellite devices can be satisfied by the mother unit. The present invention provides a cost benefit. A tray charger needs to have a system that locates the devices to be charged and provides energy to those locations only. With the present invention, there is no wild energy field because all the magnetic field runs inside the clamp core. This makes the protection easier. The mother unit can be charged in an ordinary way by a conventional charger, such as shown in FIG. 10. When the mother unit charges the satellite units via the clamp 90, the clamp functions as a core of a magnetic device; a transformer. The satellite devices can have an inductive loop that is a secondary coil of the magnetic device. The mother device can be charged to via the clamp. The satellite devices can be charged at the same time with the mother unit. Rather than the clamp, a hook, button, etc. could be used to attach to straps, loops, hangers in the satellite products when they are coupled to the mother device.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A charging device comprising:
   a battery;
   a first induction coil coupled to the battery; and
   an induction core extending through the first induction coil, wherein the induction core has a portion which extends in an outward direction trout the charging device and is adapted to removably couple with a second induction coil of a portable electronic device by extending into the second induction coil.

2. A charging device as in claim 1 wherein the portion of the induction core comprises a movable charging clamp section.

3. A charging device as in claim 1 wherein the portion of the induction core comprises a movable cantilevered section.

4. A charging device as in claim 1 wherein the charging device does not comprise an electrical connector with electrical contacts for connection to an external power source.

5. A charging device as in claim 1 wherein the battery comprises a rechargeable battery, and the induction core is adapted to induce current in the first induction coil to charge the rechargeable battery.

6. A charging device as in claim 1 wherein the battery comprises a rechargeable battery, and the charging device comprises two systems for charging the rechargeable battery, a first one of the two systems comprising the induction core for inducing a current in the first induction coil for recharging the battery, and a second one of the systems comprises an electrical connector connected to a housing of the charging device and electrically coupled to the rechargeable battery.

7. A charging device as in claim 1 further comprising a switch connected between the battery and the first induction coil for controlling whether the battery is charged or whether the battery is allowed to discharge.

8. A charging device as in claim 7 further comprising a DC/AC converter coupled between the battery and the switch.

9. A charging device as in claim 1 wherein the portion of the induction core is pivotably movable relative to a housing of the charging device.

10. A charging system for a portable electronic device comprising:
    a charging device as in claim 1; and
    a first battery charger comprising a plug adapted to be connected to an electrical outlet and an induction loop section having a hole adapted to receive the induction core in the hole, wherein the induction loop section is located on the portion of the induction core.

11. A charging system as in claim 10 further comprising a second battery charger comprising a plug adapted to be connected to an electrical outlet and an electrical connector adapted to be connected to an electrical connector of the charging device to thereby couple the battery to the second battery charger.

12. A method of charging a portable electronic device comprising steps of:
    charging a first rechargeable battery in a first charging device, the charging device comprising a first induction coil coupled to the battery and an induction core extending through the first induction coil; and
    coupling a second induction coil of the portable electronic device to the induction core such that the induction core is located in the second induction coil.
    wherein the first battery of the charging device can charge a second rechargeable battery in the portable electronic device by induction through the single induction core.

13. A method as in claim 12 wherein the step of charging the first battery comprises connecting a second charging device to the first charging device, the second charging device comprising a third induction coil which is located onto the induction core, the third induction coil being connected to an electrical plug which is adapted to be connected to an electrical outlet.

14. A method as in claim 12 wherein the step of coupling the second induction coil of the portable electronic device to the induction core comprises locating a support loop on the portable electronic device on a cantilevered portion of the induction core.

15. A method as in claim 14 wherein the step of locating the support loop on the cantilevered portion of the induction core comprises moving the cantilevered portion of the induction core from a first open position to a second closed position relative to a housing of the first charging device.

16. A method as in claim 15 wherein the step of moving the cantilevered portion comprises the cantilevered portion of forming a charging clamp which is adapted to clamp the support loop to the first charging device at the second closed position.

17. A portable electronic device comprising:
a housing having a housing support loop extending outward from the housing, the support loop being adapted to support the housing by suspension on another member;
a rechargeable battery located in the housing; and
a signal indicator extending along an elongated length of the support loop, wherein the signal indicator is adapted to visually signal at least one characteristic of the portable electronic device.

18. A portable electronic device as in claim 17 further comprising an induction coil connected to the battery, the induction coil extending through the support loop with a hole of the support loop being located in a center path of the induction coil.

19. A portable electronic device as in claim 17 wherein the at least one characteristic comprises a charge level of the battery.

20. A portable electronic device as in claim 17 wherein the at least one characteristic comprises a charging state of the battery.

21. A portable electronic device as in claim 17 wherein the signal indicator is adapted to indicate the at least one characteristic by a color or a shading change of the signal indicator.

22. A portable electronic device as in claim 17 wherein the support loop comprises a wrist strap.

23. A portable electronic device as in claim 17 further comprising a switch on the housing which is adapted to actuate the signal indicator.

24. A portable electronic device as in claim 17 further comprising means for automatically activating the signal indicator upon a predetermined event.

25. A battery charger comprising:
a plug adapted to be connected to an electrical outlet; and
an induction loop section having a hole adapted to receive an induction core of a device to be charged, the induction loop section having an induction coil coupled to the plug, wherein a center path of the induction coil is located at the hole of the induction loop section, and wherein the induction loop section is adapted to be removably placed on the induction core and surround a portion of the induction core to allow the induction coil to induce current in the induction core.

26. A battery charger as in claim 25 wherein the induction loop section comprises a flexible strap with the hole being a hole surrounded by the strap.

27. A battery charger comprising:
an induction coil;
an induction core extending through a center channel of the induction coil, the induction core comprising a portion extending out of the center channel a predetermined distance;
a power feed section connected to the induction coil for supplying the induction coil with AC voltage; and
a housing surrounding the induction coil and the induction core, the housing comprising a first section adapted to be fixedly stationarily attached to a substantially vertical mounting surface and a second section extending outward from the first section, wherein the portion of the induction core extends at least partially along the second section of the housing, wherein the second section extends outward from the first section as a general cantilever.

28. A battery charger as in claim 27 wherein the second section of the housing comprises a general oval shape.

29. A battery charger as in claim 27 wherein the second section of the housing comprises a general egg shape.

30. A battery charger as in claim 28 wherein the general egg shape is vertically orientated and a back side of the general egg shape is connected to the first section of the housing.

31. A battery charger as in claim 27 wherein the second section comprises at least two cantilevered beam sections extending from a connection section with the first section of the housing.

32. A battery charger as in claim 31 wherein the two cantilevered beam sections extending in generally opposite directions from each other.

33. A charging system for a portable electronic device comprising:
a charging device comprising:
a rechargeable battery;
a first induction coil coupled to the battery; and
an induction core extending through the first induction coil, wherein the induction core is adapted to removably couple with a second induction coil of a portable electronic device by extending into the second induction coil; and
a first battery charger comprising a plug adapted to be connected to an electrical outlet and an induction loop section having a hole adapted to receive the induction core in the hole.

* * * * *

UNITED STATES PATENT AND TRADEMARK OFFICE
CERTIFICATE OF CORRECTION

| | |
|---|---|
| PATENT NO. | : 7,180,265 B2 |
| APPLICATION NO. | : 10/694638 |
| DATED | : February 20, 2007 |
| INVENTOR(S) | : Naskali et al. |

It is certified that error appears in the above-identified patent and that said Letters Patent is hereby corrected as shown below:

Claim 1: Column 13, line 58, delete "trout" and insert --from--.

Signed and Sealed this

Seventeenth Day of April, 2007

JON W. DUDAS
*Director of the United States Patent and Trademark Office*